(12) United States Patent
Bogdanovich et al.

(10) Patent No.: US 6,345,598 B1
(45) Date of Patent: Feb. 12, 2002

(54) 3-D BRAIDED COMPOSITE VALVE STRUCTURE

(75) Inventors: Alex Bogdanovich, Apex; Dmitri Mungalov, Raleigh, both of NC (US)

(73) Assignee: 3Tex, Inc., Cary, NC (US)

( * ) Notice: Subject to any disclaimer, the term of this patent is extended or adjusted under 35 U.S.C. 154(b) by 0 days.

(21) Appl. No.: 09/667,951

(22) Filed: Sep. 22, 2000

(51) Int. Cl.$^7$ .................................................. F01L 3/02
(52) U.S. Cl. ........................................................ 123/188.3
(58) Field of Search ........................................ 123/188.3

(56) References Cited

U.S. PATENT DOCUMENTS

| | | | |
|---|---|---|---|
| 4,433,652 A | | 2/1984 | Holtzberg et al. |
| 4,928,645 A | * | 5/1990 | Berneburg et al. ........ 123/188.3 |
| 5,094,200 A | | 3/1992 | Fontichiaro |
| 5,792,402 A | | 8/1998 | Rivers, et al. |
| 5,934,648 A | * | 8/1999 | Rivers et al. ............. 123/188.3 |
| 6,009,843 A | * | 1/2000 | Griffin et al. ............. 123/188.3 |
| 6,085,714 A | * | 7/2000 | Wilson et al. ............. 123/188.3 |

* cited by examiner

Primary Examiner—Marguerite McMahon
Assistant Examiner—Jason Benton
(74) Attorney, Agent, or Firm—Glasgow Law Firm

(57) ABSTRACT

A three-dimensional engineered fiber preform having a unitary, integral and seamless structure and rigid composite structure made therefrom for use as a mechanical component, particularly for use as a valve, and method for making the preform. The integral design and structure of the preform is formed by a combination of interlacing and non-interlacing fiber systems that permits variable cross-sectional area and dimensions from a first end to a second end along an axis, or from a stem end to a head end of a valve. A particular embodiment of the invention is an integral design of a carbon—carbon composite valve structure for engines of internal combustion, formed by set of straight and interlacing continuous reinforcing yarns with the help of the device with the combined mechanical scheme, allowing to produce various types of axis-symmetric braiding architectures, including, but not limited to cylindrical, conical, and radial yarn placement to make an integral valve with continuously variable reinforcement architecture at various zones of the said valve.

38 Claims, 10 Drawing Sheets

3-D BRAIDED COMPOSITE VALVE STRUCTURE

BACKGROUND OF THE INVENTION

(1) Field of the Invention

The present invention relates generally to three-dimensional braided structures, more particularly, to three-dimensional braided preform structures and rigid composites made therefrom.

(2) Description of the Prior Art

Typically, it is known to use braided preforms for composites and laminated structures. Additionally, the use of high performance fibers within multilayer preforms and composite structures is known in the art. Additionally, thermosetting, thermoplastic, ceramic, and carbon materials have been used in prior art to fuse fibers of textile structures for certain applications.

The invention is applicable to the design and manufacturing of valves for internal combustion engines, more specifically, carbon—carbon (CC) composite valves. The design of valves from CC composites was developed for many years with growing success due to their high thermal stability, dimensional stability in a wide range of temperatures, and low weight of the material. Typically, fibrous CC composites have low density, high durability and high elastic modulus in the directions of reinforcement. The low value of thermal expansion coefficient of CC composites, close to zero (0), allows successful use of these composites in environments of high temperature gradients and thermo-cycling, without inducing thermal stresses. CC composite parts and structures are widely used and have represented themselves well in aerospace engines applications. Anisotropic properties of CC composite materials allow one to find optimum design of parts having complex shape and working under complex stress/strain state.

Traditionally, a composite valve is made of several separate elementary parts. These separate parts have been encased by a braid, bonded, and/or mechanically interlocked with use of complex-shaped connecting features. Braiding is one of the set of technologies having been used to manufacture separate parts of the valve structures in the past. Prior art valves are described in U.S. Pat. Nos. 5,792,402, 4,433, 652, and 5,094,200, are not integral structures, and consist of several parts manufactured separately and subsequently joined together to form a valve structure.

Development of a novel technology for manufacturing of integral valve structures would overcome the complex and multiple step manufacturing processes currently used in automotive industry. Further, the integration of the aforementioned separate components precludes the failure of valves by separation of said parts.

Thus, there remains a need for a three-dimensional engineered fiber preform for use as a mechanical component, more particularly, a complex shaped three-dimensional braided fiber preform formed and constructed of a unitary, integral construction including a plurality of fibers.

SUMMARY OF THE INVENTION

The present invention is directed to a complex shaped, three-dimensional engineered fiber preform having a unitary, integral and seamless structure and rigid composite structure made therefrom for use as a mechanical component, particularly for use as a valve, and method for making the preform.

In the preferred embodiment, the integral design and structure of the preform is formed by a combination of interlacing and non-interlacing fiber systems that permits variable cross-sectional area and dimensions of a complex shape from a first end to a second end along an axis, or from a stem end to a head end of a valve.

Preferably, a particular embodiment of the invention is an integral design of a carbon—carbon composite valve structure for engines of internal combustion, formed by set of straight and interlacing continuous reinforcing yarns with the help of the device with the combined mechanical scheme, allowing to produce various types of axis-symmetric braided architectures, including, but not limited to cylindrical, conical, and radial yarn placement to make an integral valve with continuously variable reinforcement architecture at various zones of the valve.

The present invention is further directed to a method for making a complex shaped, three-dimensional engineered fiber preform having a unitary, integral and seamless structure and rigid composite structure made therefrom.

Accordingly, one aspect of the present invention is to provide a complex shaped, three-dimensional engineered fiber preform having a unitary, integral and seamless structure and rigid composite structure made therefrom for providing increased component strength, durability, and stability.

These and other aspects of the present invention will become apparent to those skilled in the art after a reading of the following description of the preferred embodiment when considered with the drawings.

DETAILED DESCRIPTION OF PREFERRED EMBODIMENTS

Figure 1:
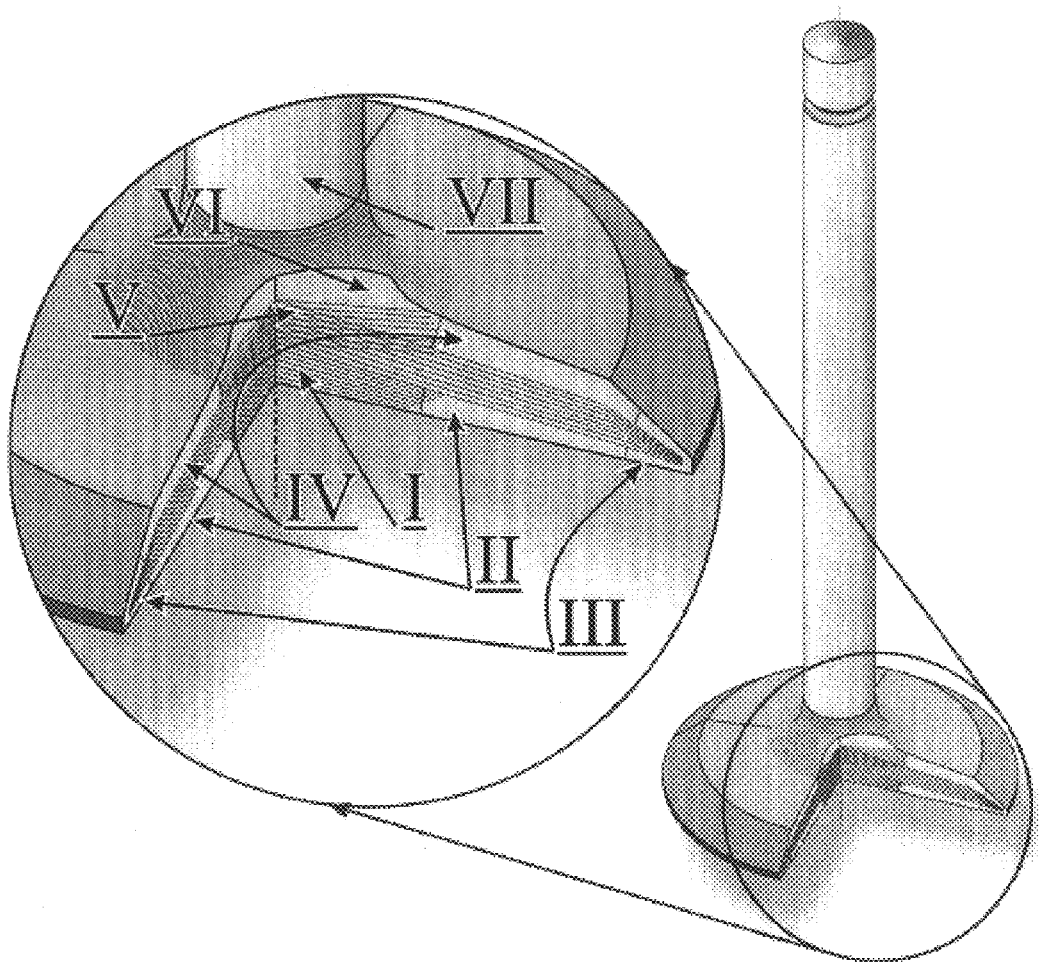
FIG. 1 Partially sectioned view of the integrally braided skeleton structure of the valve.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms. Referring now to the drawings in general, the illustrations are for the purpose of describing a preferred embodiment of the invention and are not intended to limit the invention thereto. FIG. 1, generally referenced 10, shows a preferred embodiment constructed according to the present invention. The present invention and preferred embodiments thereof include a complex shaped, three-dimensional engineered fiber preform having a unitary, integral and seamless structure and rigid composite structure made therefrom for use as a mechanical component, particularly for use as a valve, and method for making the preform.

The integral carbon—carbon valve composite structure is continuously and consistently formed with the combined braiding techniques and equipment. Two independent mechanisms are used to move fiber packages containing fibers selected from the group consisting of carbon fibers, ceramic fibers, glass fibers, and the like. The braided preform used for making the finished composite structure is constructed from a continuous interlacing of a plurality of fibers from the fiber packages. The preform is capable of being manufactured in a continuous series of preforms, which can be disconnected from adjacent preforms and finished separately.

Additionally, select predetermined non-interlacing fibers are used to provide increased structural integrity and strength along the axis of the complex-shaped composite structure, e.g., a valve (according to a preferred embodiment). These select predetermined non-interlacing fibers are present continuously along the preform from a first end, or stem end, to a second end, or head face end, together with select predetermined interacing or braided fibers forming a continuous transition zone between these ends. In a preferred embodiment, the non-interlacing fibers terminate at the first end and the interlacing fibers and non-interlacing fibers both terminate at the second end but may exit at different locations and the interlaced fibers exit at the perimeter and the non-interlaced fibers exit at the center or axis portion of the valve. Notably, a plurality of reinforcing fibers are arranged in a direction that is substantially along the axial direction of the preform for providing increased axial stiffness, strength, and stability. Furthermore, the preform is later reinforced with a matrix, preferably a polymeric matrix, resulting in a near net shape structure that is further processed to form the finished composite structure. In the valve structure preferred embodiment, the matrix is a carbon matrix. Additional processing to form the final composite may include but is not limited to machining, polishing, and coating to form a smooth, uniform surface.

Figure 2:
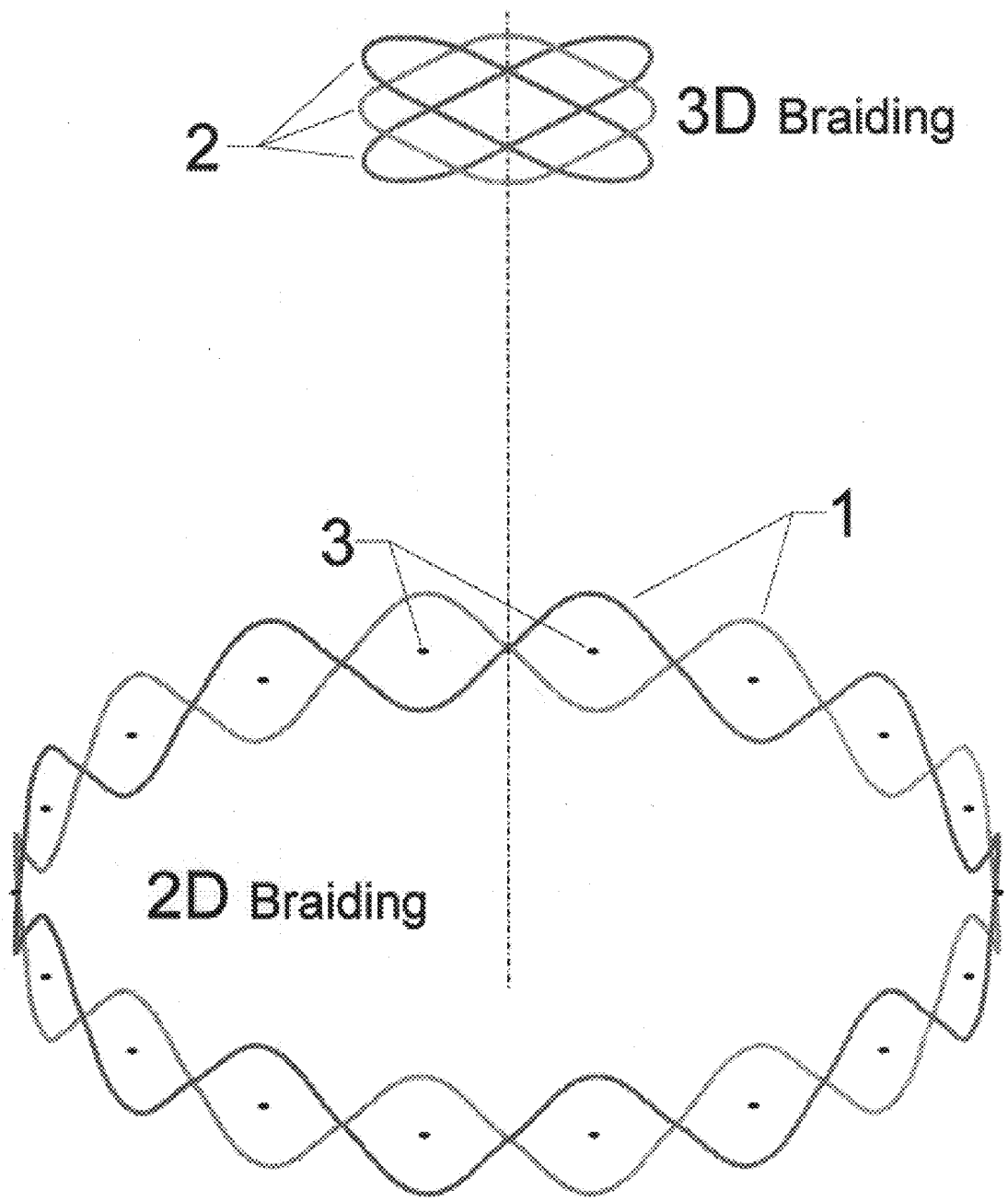
FIG. 2 Schematic of the paths of fiber packages for spiral weaving and spatial 3D braiding.

Trajectories of moving fiber packages are schematically shown in FIG. 2, where (1) is a trajectory of fiber packages for spiral braiding, (2) is a trajectory of fiber packages for 3D braiding, and (3) shows the locations of motionless fiber packages for rectilinear reinforcement. Both mechanisms use the same number of fiber packages.

Figure 3:
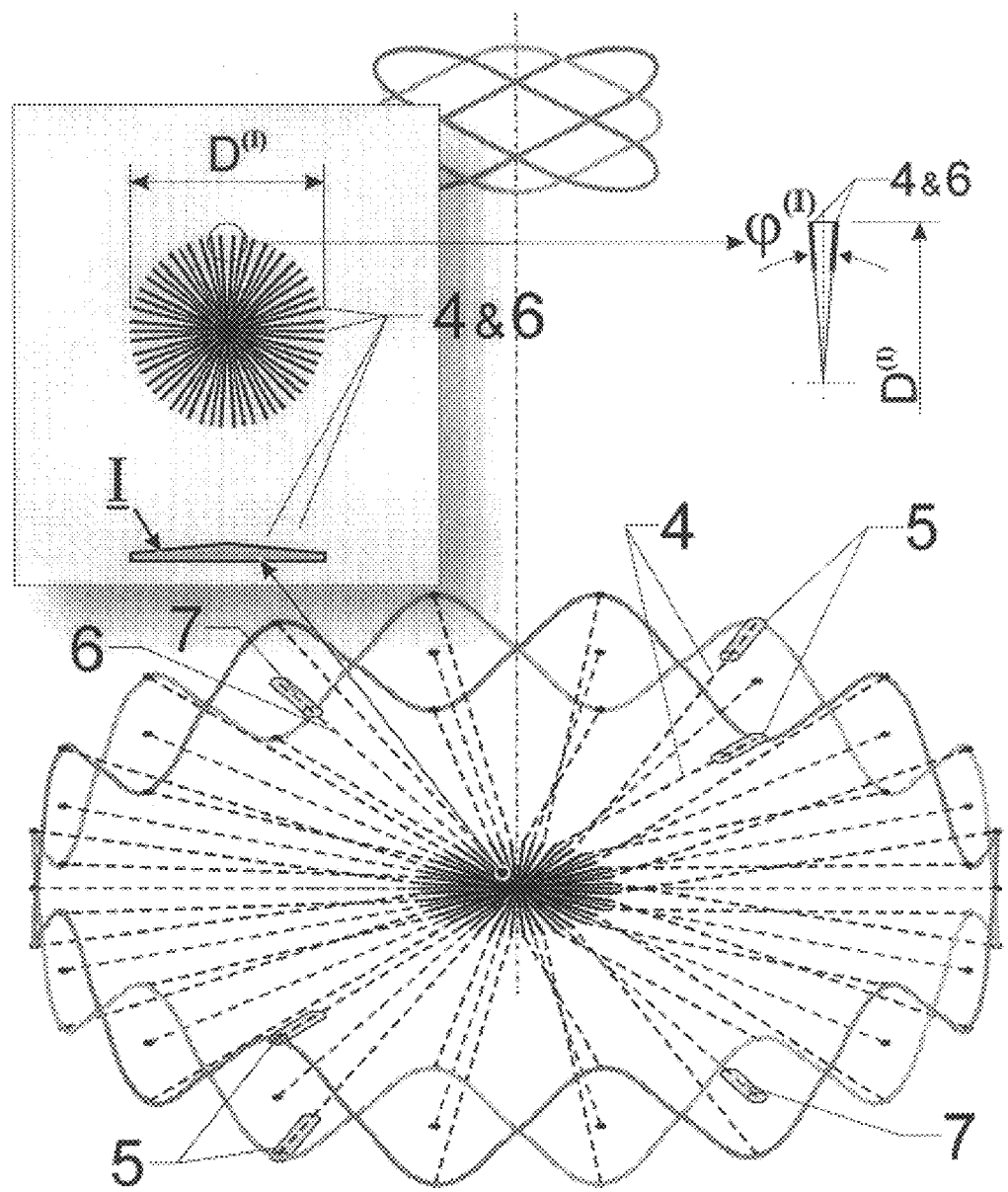
FIG. 3 Initial position, subsequent braiding paths, and resulting orientation of the reinforcement yarns in the spiral weaving mechanism during formation of a tulip style valve head (I).

The ends of the reinforcement yarns of one family (4) are inserted into opposing mobile spindles (5) (hereinafter shown in part) in such a manner that the middle part of yarn is in the center of a circle, as shown in FIG. 3. Yarns of the second family 6 are inserted into the oppositely located spindles (7) (hereinafter shown in part) in motionless points (3), FIG. 2. Radial yarns 4 and 6 pass through the center of a circle, forming flat zone I with radial reinforcement. External diameter of this zone is $D^{(I)}$ and radial reinforcement step is $\phi^{(I)}$, which is a multiple of the number of yarns of families (4) and (6). Zone I is the central (median) part of the head of valve working surface.

Figure 4:
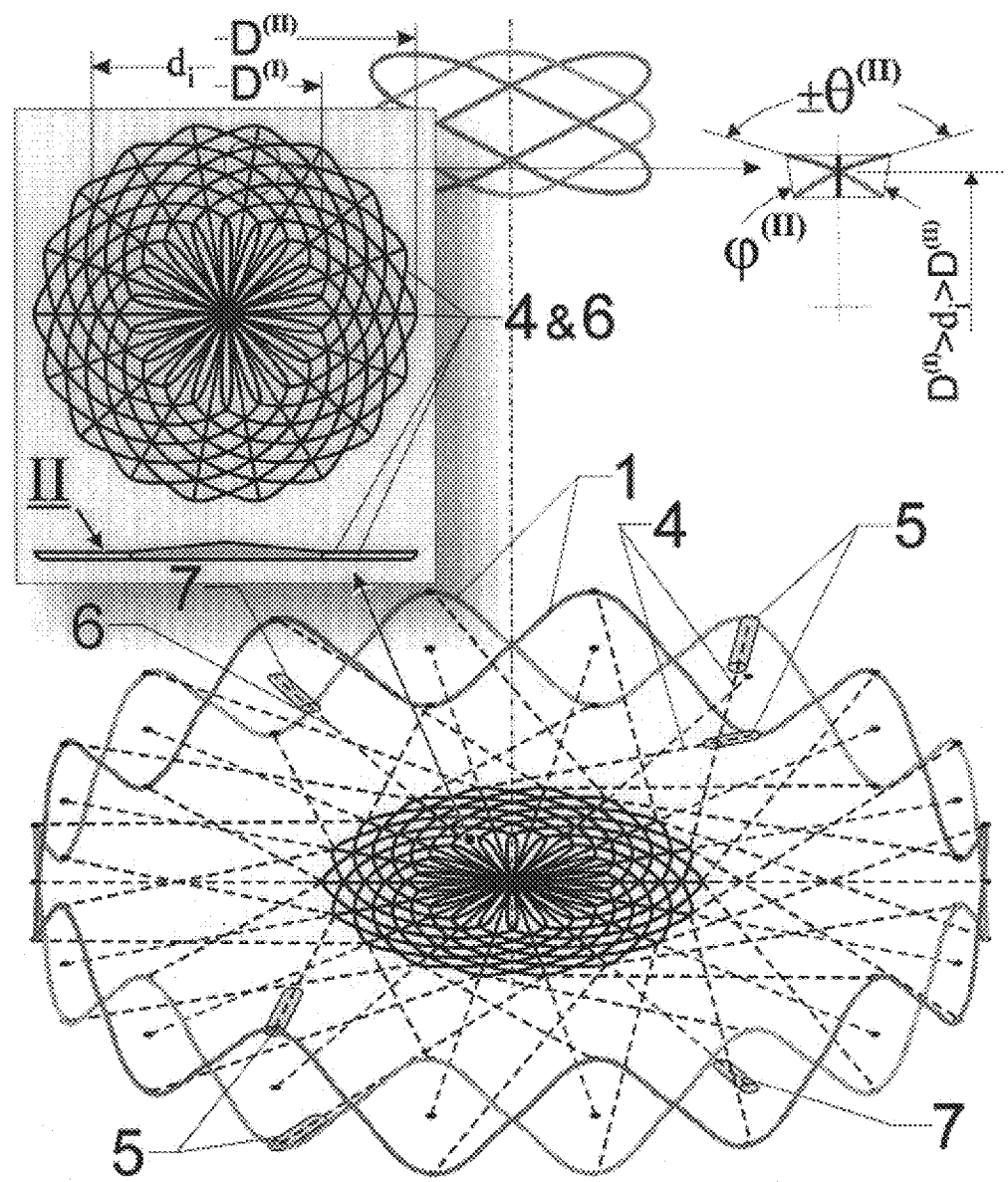
FIG. 4 Schematic of an arrangement of reinforcement yarns for formation of polar braiding zone II, with flat two dimensional reinforcement of the peripheral portion of the valve head and schematic of its unit cell.

The moving spindles (5) follow trajectories (1) during operation of the spiral braiding mechanism, FIG. 2, with braiding yarns (4), over, and about the motionless radial yarns (6). FIG. 4. Planar zone II has the spiral polar interlacing yarns (4) extending from external diameter $D^{(I)}$ of area I to the external diameter $D^{(II)}$ of area II. Immovable radial yarns (6) are interlaced by yarns (4.) All yarns (4) and (6) continuously pass from area I and subsequently produce flat braided reinforced zone II with three directions of reinforcement in a repeating unit cell. The zone II has radial directions of reinforcement produced by family of yarns (6) and two symmetric, curvilinear reinforcement directions produced by yarns (4) with braiding angles $\pm\theta^{(II)}$ which are function of $d_i$. The structural unit cell has a prismatic shape with a trapezoidal base and angle between two lateral faces being equal to $\phi^{(II)}$. An angle $\phi^{(II)}$ is multiple to the number of yarns of family (6). The zone II is a part of a working surface of the valve head.

Figure 5:
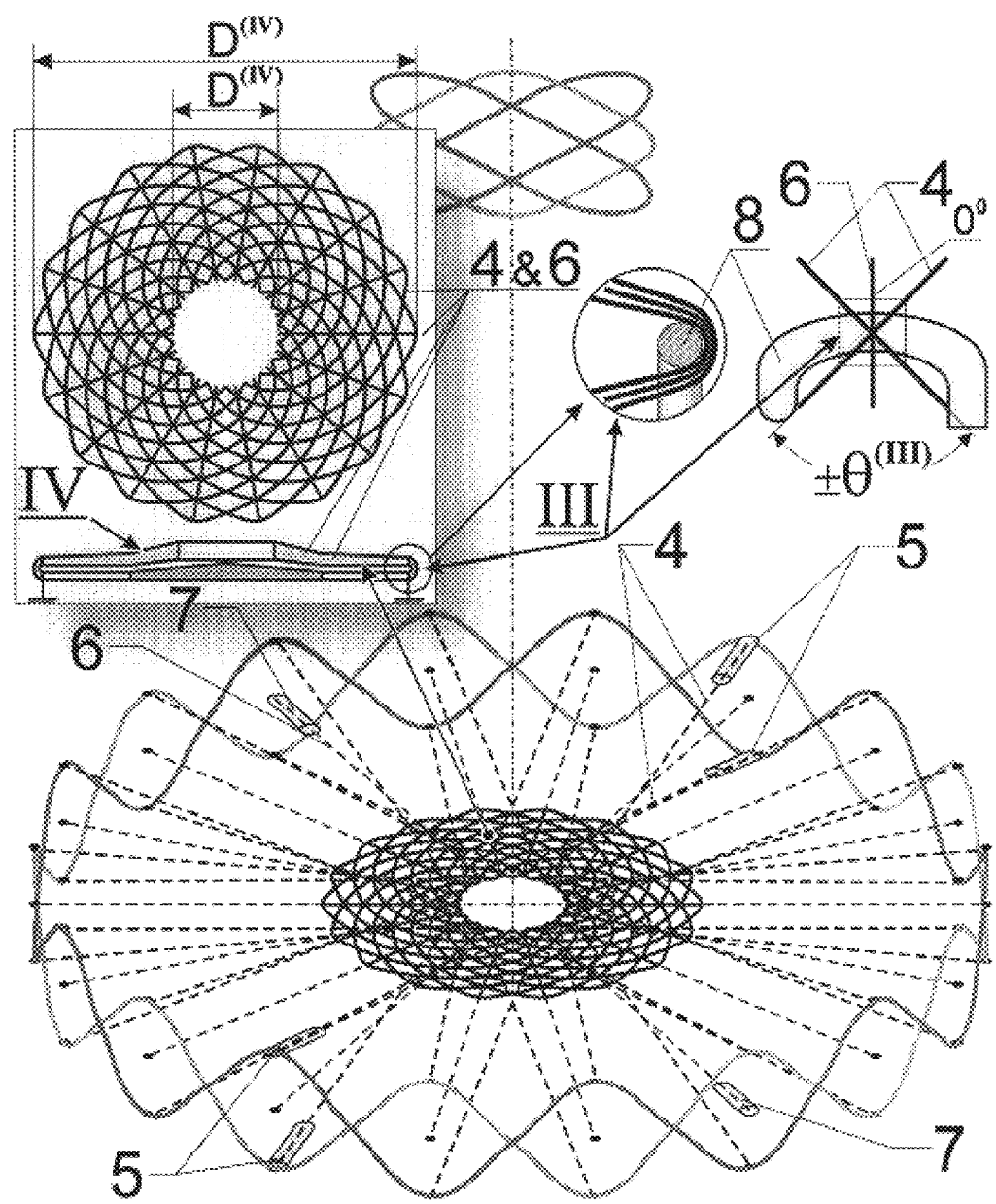
FIG. 5 Schematic of an arrangement of reinforcement yarns in polar braiding zone IV with flat two dimensional reinforcement, and reinforcement architecture of continuous transition zone III approaching the external face surface valve head.

After reaching the external diameter of zone II, yarns (4) and (6) are fixed by elements (8) along the entire periphery, as shown in FIG. 5, and are moved then in the opposite direction from the periphery towards the center. Thus, continuous transitive zone III with toroid shaped surface, having three reinforcement directions in every node, is formed. Yarns (4) bend around the fixing element (8) at angle $\pm\theta^{(III)}$ and continuously continue the process of flat polar braiding in a direction from external diameter $D^{(IV)}=D^{(II)}$ towards the central axis of symmetry of the valve until reaching the internal diameter $d^{(IV)}$ of zone IV. Yarns (6) bend around the fixing element (8) in a plane inclined at angle 0° to a longitudinal axis of the valve. The conical zone IV produced has the same unit cell as zone II. This unit cell is produced by polar-spiral interlacing of yarns (4) and straight radial yarns (6) going continuously from zone II towards the beginning of transition zone of valve stem. The zone IV is an external surface of the valve head.

Figure 6:
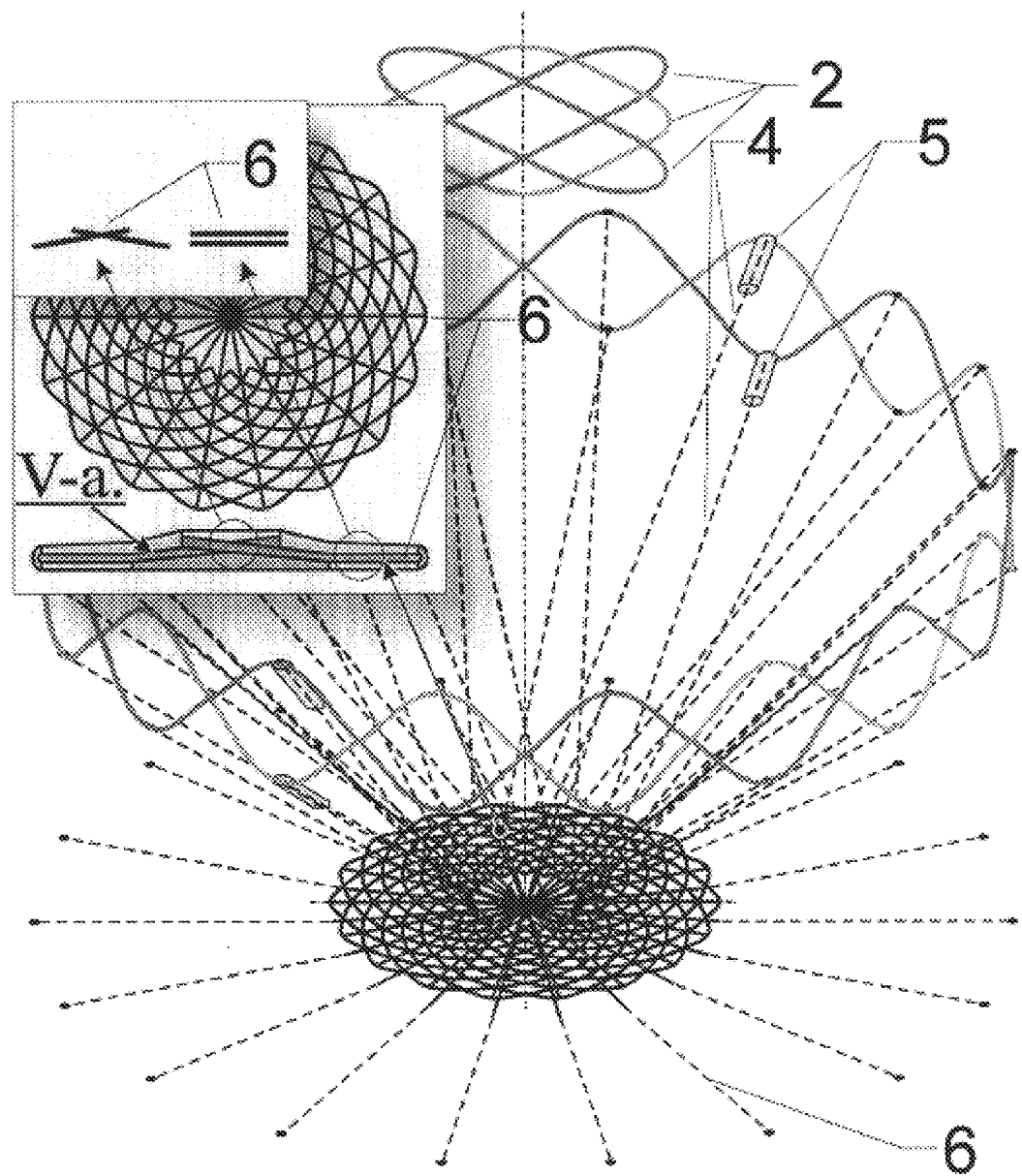
FIG. 6 Schematic of an arrangement of straight reinforcement yarns in flat radially reinforced zone V inside valve head during the first formation step (a).

All yarns (4), forming braided part of the valve external surface zone IV, together with the spiral braiding mechanism, move along a longitudinal axis in a direction of the 3D braiding mechanism (2), relative to the basis of the valve, as in FIG. 6. In turn, yarns (6), forming a radial direction of reinforcing in zone IV, are passed from the edge of an internal circle of zone IV towards the radial direction through the center of zones IV and II in a space between nodes of zone III and pass outside the fiber structure. Thus, yarns (6), without yarns (4), form the first stage (a) of valve head interior zone V formation.

Figure 7:
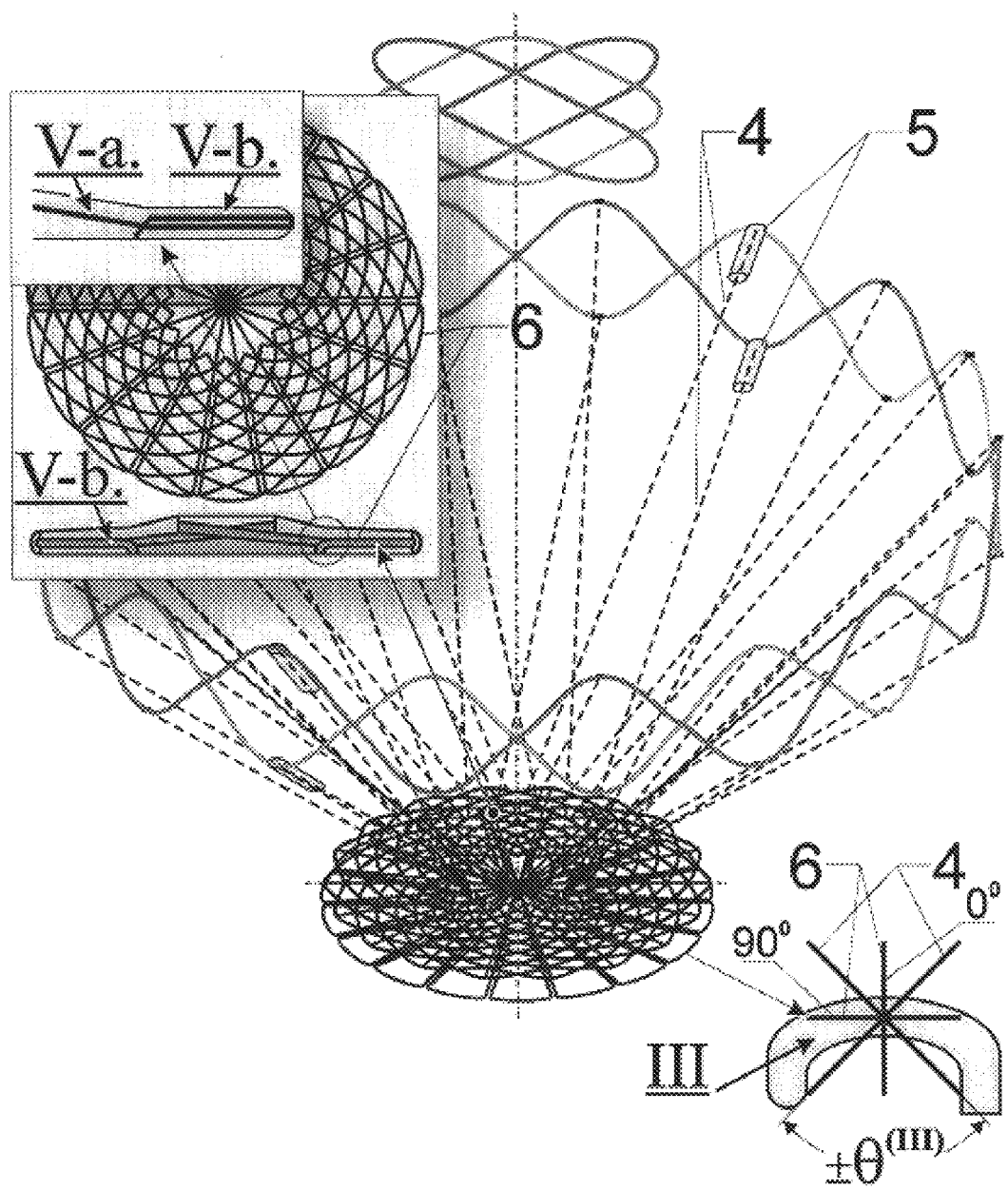
FIG. 7 Schematic of an arrangement of straight reinforcement yarns in flat radial reinforced zone V inside valve head during the second formation step (b), and schematic of hoop reinforcement introduction into transient zone III.

At the second stage (b) yarns (6) are returned back in a opening between zones II and IV through the clearance between nodes of zone III next to adjacent yarn, FIG. 7. Further yarns (6) exit structure along the border of zones I and II of valve head working surface, to be cut off after manufacturing of valve skeleton is completed. Thus, flat zone V with straight radial reinforcement is formed by all yarns (6) in two stage process (a and b). Zone V represents integral reinforcement architecture of the valve head as formed in stages a. and b.

The yarns of family (6), between an exit and an entrance in the zone III, form an additional fourth reinforcement and are arranged in a plane inclined at angle 90° to a longitudinal axis of the valve, FIG. 7. Thus, yarns (4) and (6) reinforce zone III in four directions at angles 0°, 90° and ±θ$^{(III)}$. The continuous transient zone III forms an external edge of the valve head.

Figure 8:
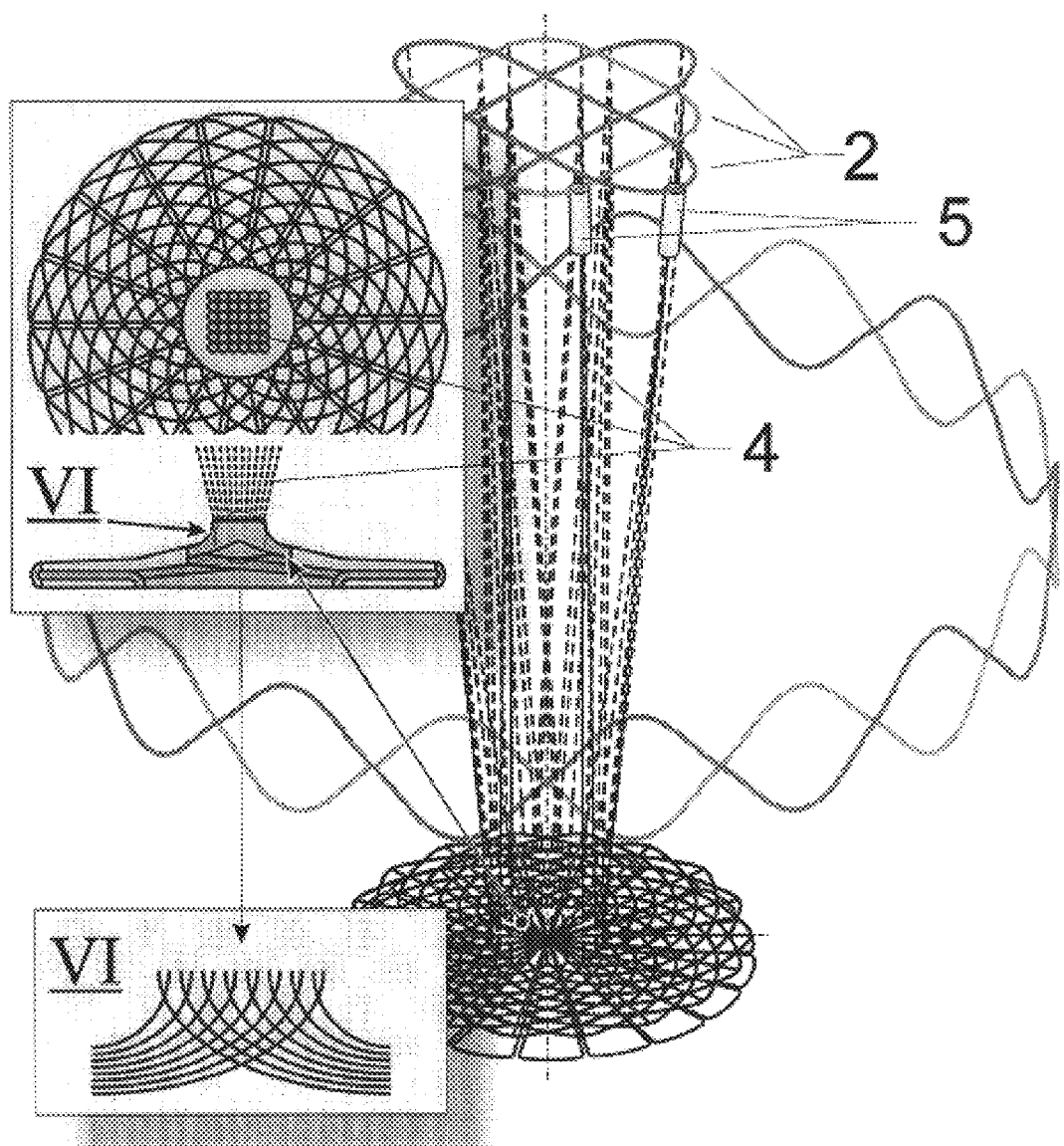
FIG. 8 Schematic of an arrangement of curvilinear reinforcement yarns in transient zone VI between valve head and valve stem, and schematic of the initial arrangement of yarns in 3D braiding device.
Figure 9:
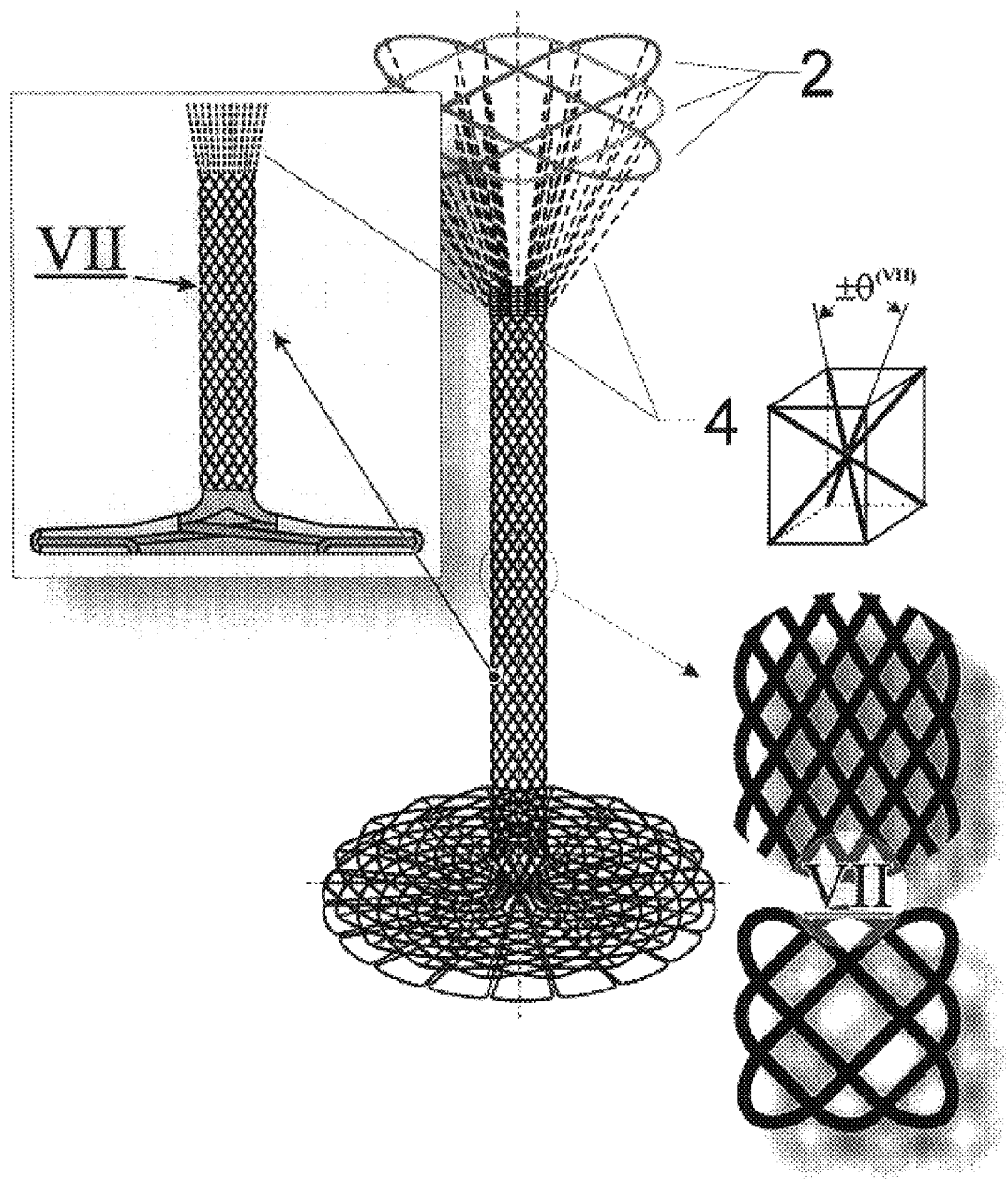
FIG. 9 Schematic of an arrangement of spatially interlacing yarns in a valve stem, and the schematic of reinforcement architecture in 3D braiding zone VII.

After formation of zone III, yarns (6) move from the spiral braiding mechanism into 3D braiding mechanism (2) in such a way that they pass from valve head to valve stem in the transient zone VI, interlacing each other, from an internal circle with diameter d$^{(IV)}$ of zone IV towards a valve stem plane, FIG. 8. The transient zone VI continuously connects the valve head and valve stem, and is a transition area from flat spiral braiding to 3D braiding. Then all yarns of family (6) move along trajectories of 3D braiding mechanism as shown in FIG. 9. Yarns (6) thus form zone VII of spatially braided architecture with braiding angle being equal to ±θ$^{(VII)}$. The zone VII forms valve stem.

Figure 10:
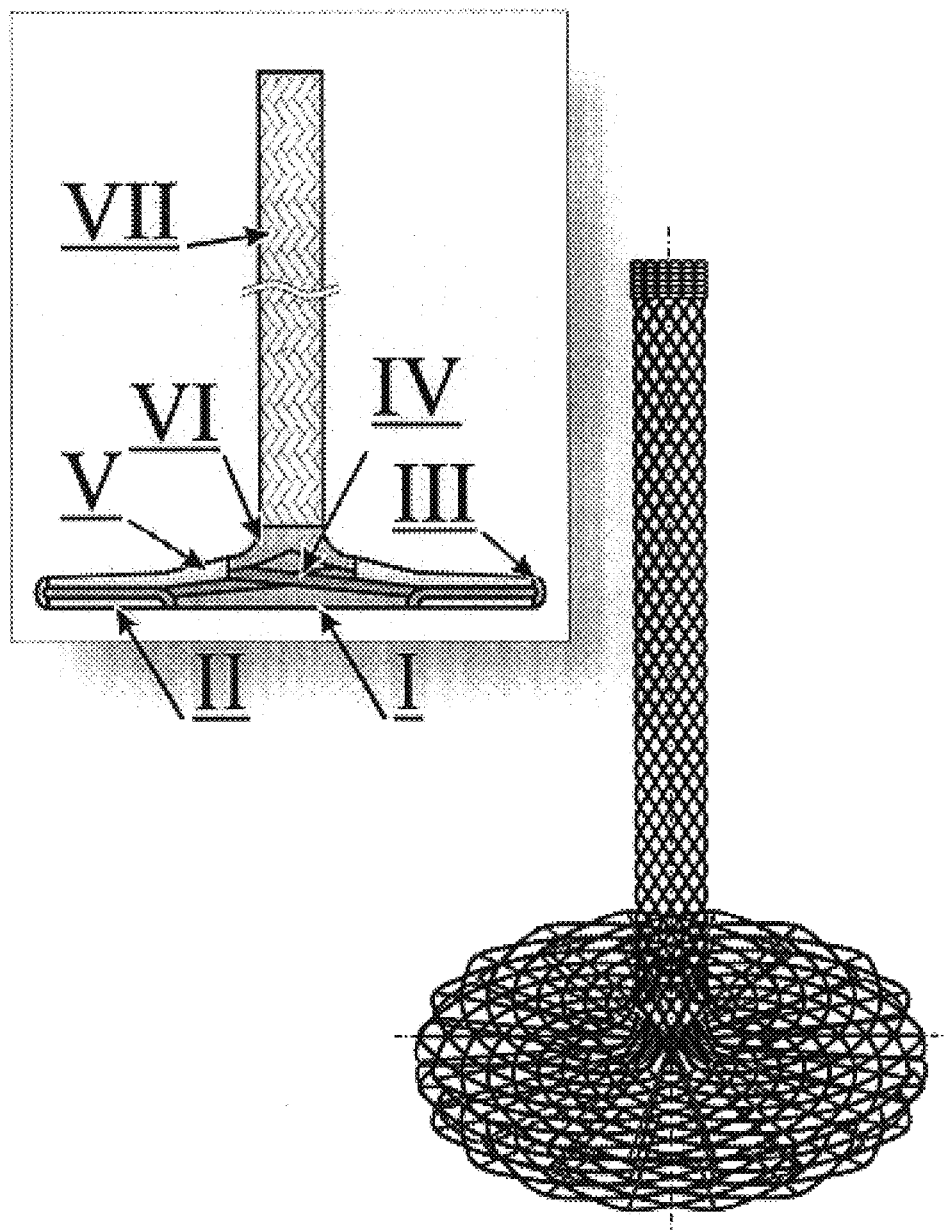
FIG. 10 Schematic of an arrangement of braiding zones with various reinforcement architectures in an integral skeleton of the valve.

At the final stage of manufacturing of valve preform, yarns of family (4) are cut off to plane coincident with valve head face, and a yarn of family (6) are cut off to level with length of valve stem, as shown in FIG. 10.

EXAMPLE 1

An integral carbon—carbon valve composite structure is made on the combined equipment using commercially available Thornel T300 15K carbon fibers. The total number of yarns is 27. The ends of 9 yarns are filled in the diametrically opposite spindles established in motionless points. The ends of 18 yarns are filled in the diametrically opposite spindles established in the polar braiding mechanism. The integral structure of the valve preform is produced according to the sequence described above. The external diameter D$^{(I)}$ of zone I is equal to 1", and angle φ$^{(I)}$=6.6°. External diameters D$^{(II)}$ and D$^{(IV)}$ of zones II and IV are equal to 2", internal diameter d$^{(IV)}$ of zone (IV) is 0.75", and angle φ$^{(II)}$=10°. Thickness of valve head is 5/16" . Length of the valve stem is 7", and cross-section area is 5/16". Braiding angle of the valve stem in the zone VII is 10°. Weaving ±θ$^{(VII)}$ in the field of VII has made legs of the valve 20 degrees. The number of yarns for manufacturing of the valve stem is equal to 36, which corresponds to the number of the ends filled in braiding spindles.

Certain modifications and improvements will occur to those skilled in the art upon a reading of the foregoing description. All modifications and improvements have been deleted herein for the sake of conciseness and readability but are properly within the scope of the following claims.

We claim:

1. A three-dimensional engineered fiber preform for use as a component for an engine comprising:
   a complex shaped three-dimensional braided fiber preform formed and constructed of a unitary, integral construction formed solely of a plurality of fibers.

2. The three-dimensional engineered fiber preform according to claim 1, wherein the three-dimensional braided fiber preform has a first end and a second end, the distance therebetween establishing an axial direction and a cross-sectional area perpendicular thereto, the braided preform being constructed of a continuous interlacing of the plurality of fibers.

3. The three-dimensional engineered fiber preform according to claim 2, further including select predetermined non-interlacing fibers included with the plurality of fibers.

4. The three-dimensional engineered fiber preform according to claim 2, wherein the three-dimensional braided fiber preform has a variable cross-sectional area.

5. The three-dimensional engineered fiber preform according to claim 2, wherein the dimensions of the three-dimensional braided fiber preform are variable.

6. The three-dimensional engineered fiber preform according to claim 1, wherein the three-dimensional braided fiber preform is seamless.

7. The three-dimensional engineered fiber preform according to claim 1, wherein the three-dimensional braided fiber preform is formed of at least one fiber system formed of at least one type of fiber.

8. The three-dimensional engineered fiber preform according to claim 7, wherein the high performance fibers are selected from the group consisting of carbon fibers, ceramic fibers, and glass fibers.

9. The three-dimensional engineered fiber preform according to claim 1, wherein the three-dimensional braided fiber preform is used to form a rigid composite structure.

10. The three-dimensional engineered fiber preform according to claim 1, wherein the three-dimensional braided fiber preform is constructed, configured and dimensionally sized to form a valve structure, wherein the three-dimensional braided fiber preform first end is a stem end and the second end is a head face end.

11. The three-dimensional engineered fiber preform according to claim 1, wherein the plurality of interlacing fibers and the select, predetermined non-interlacing fibers are present continuously along the preform from the first end to the second end.

12. The three-dimensional engineered fiber preform according to claim 11, wherein the three-dimensional braided fiber preform includes at least one continuous transition zone between the first end and the second end, thereby providing a controlled change between regions having different cross-sectional areas.

13. The three-dimensional engineered fiber preform according to claim 11, wherein the non-interlacing fibers terminate at the first end.

14. The three-dimensional engineered fiber preform according to claim 11, wherein the interlacing fibers and non-interlacing fibers terminate at the second end but may exit at different locations wherein the interlaced fibers exit at the perimeter and the non-interlaced fibers exit at the center or axis portion of the valve.

15. The three-dimensional engineered fiber preform according to claim 1, further including a plurality of reinforcing fibers arranged substantially along the axial direction of the preform for providing increased axial stiffness, strength, and stability.

16. The three-dimensional engineered fiber preform according to claim 9, wherein the preform is reinforced with a matrix, resulting in a near net shape structure.

17. The three-dimensional engineered fiber preform according to claim 16, wherein the matrix is a polymeric matrix.

18. The three-dimensional engineered fiber preform according to claim 16, wherein the matrix is a carbon matrix.

19. The three-dimensional engineered fiber preform according to claim 16, wherein the near net shape structure is machined to a final shaped structure.

20. The three-dimensional engineered fiber preform according to claim 19, wherein the final shaped structure includes a smooth, uniform surface.

21. The three-dimensional engineered fiber preform according to claim 20, wherein the smooth, uniform surface is polished and coated.

22. The three-dimensional engineered fiber preform according to claim 1, wherein the preform is capable of being manufactured in a continuous series of preforms.

23. The three-dimensional engineered fiber preform according to claim 22, wherein each of the preforms manufactured in the continuous series is disconnected from adjacent preforms and finished separately.

24. A rigid, three-dimensional composite structure for use as a mechanical component for an engine comprising:

a three-dimensional braided fiber preform formed and constructed of a unitary, integral construction solely including a plurality of fibers, the preform being reinforced with a carbon matrix and treated to form a near net shape structure having a first end and a second end existing at a spaced apart distance from each other along an axis.

25. The composite structure according to claim 24, wherein the cross-sectional area of the structure is symmetric about the axis.

26. The composite structure according to claim 24, wherein the cross-sectional area of the structure is variable along the axis.

27. The composite structure according to claim 24, further including a smooth, uniform surface.

28. A rigid, three-dimensional composite structure for use as a lightweight engine valve comprising:

a three-dimensional braided fiber preform formed and constructed of a unitary, integral and seamless construction solely including a plurality of fibers, including interlacing fibers and non-interlacing fibers, the preform being consolidated with a carbon matrix and processed to form a near net shape structure having variable dimensions including a variable cross-section along the axial direction of the valve from a stem end to a head end.

29. A method for forming three-dimensional engineered fiber preform for use as a mechanical component comprising the steps of:

providing at least one three-dimensional braided preform formed and constructed of an integral component.

30. The method according to claim 29, further including the steps of producing a multiplicity of three-dimensional braided preforms in a continuous series along an axial direction, wherein each of the preforms is separated, trimmed, and finished into a final composite structure separately.

31. The method according to claim 30, wherein the cross-sectional area of each preform is variable.

32. The method according to claim 30, further including the step of introducing at least two fiber systems for forming the at least one preform, including a straight fiber system and an interlacing fiber system, the at least two fiber systems being present at any part of the preform along the axial direction.

33. The method according to claim 30, wherein the preform is formed simultaneously by the at least two fiber systems.

34. The method according to claim 30, further including the step of transitioning between at least two zones having different cross-sectional dimensions and shapes along the axial direction.

35. The method according to claim 34, further including the step of continuously changing the direction of braiding of the at least two fiber systems during the transitioning between the at least two zones.

36. The method according to claim 34, further including the steps of transitioning between each of the continuous series of preforms thereby providing the capability to form different cross-sectional dimensions and shapes along the axial direction from a second end of a preform to a first end of the next sequential preform formed directly thereafter along the axial direction.

37. The method according to claim 34, further including the step of introducing at least one new fiber system at any intermediate step in the process, including straight fiber systems and interlacing fiber systems.

38. The method according to claim 34, further including the step of guiding to a point of exiting the preform at least one included fiber system at any intermediate step in the process, including straight fiber systems and interlacing fiber systems.

* * * * *